United States Patent
Bhat (10) Patent No.: US 8,019,791 B2
(45) Date of Patent: Sep. 13, 2011

(54) METHOD AND SYSTEM FOR TRANSFORMING METADATA MODELED IN THE COMMON INFORMATION MODEL INTO GRID CONTROL TARGET METADATA

(75) Inventor: Guru Bhat, Nashua, NH (US)

(73) Assignee: Oracle International Corporation, Redwood Shores, CA (US)

(*) Notice: Subject to any disclaimer, the term of this patent is extended or adjusted under 35 U.S.C. 154(b) by 119 days.

(21) Appl. No.: 11/603,117

(22) Filed: Nov. 22, 2006

(65) Prior Publication Data
US 2008/0120327 A1 May 22, 2008

(51) Int. Cl.
*G06F 7/00* (2006.01)
*G06F 17/30* (2006.01)

(52) U.S. Cl. ........ 707/802; 707/807; 707/810; 709/200; 709/225

(58) Field of Classification Search ............ 707/10, 707/100–102, 104.1, 802, 803, 807, 810; 709/200, 225
See application file for complete search history.

(56) References Cited

U.S. PATENT DOCUMENTS

| | | | | |
|---|---|---|---|---|
| 6,775,700 | B2 * | 8/2004 | Cheng et al. | 709/225 |
| 6,854,122 | B1 * | 2/2005 | Sheriff et al. | 719/316 |
| 6,862,736 | B2 * | 3/2005 | Hudis et al. | 719/316 |
| 6,971,090 | B1 * | 11/2005 | Gruttadauria et al. | 717/136 |
| 6,996,809 | B2 * | 2/2006 | Muhlestein et al. | 717/130 |
| 7,188,121 | B2 * | 3/2007 | Tracey et al. | 707/103 R |
| 7,191,410 | B1 * | 3/2007 | Kruempelmann et al. | 715/853 |
| 7,383,534 | B1 * | 6/2008 | Agbabian et al. | 717/120 |
| 2002/0004815 | A1 * | 1/2002 | Muhlestein et al. | 709/201 |
| 2002/0091809 | A1 * | 7/2002 | Menzies et al. | 709/223 |
| 2003/0220963 | A1 * | 11/2003 | Golovinsky et al. | 709/203 |
| 2003/0225801 | A1 * | 12/2003 | Devarakonda et al. | 707/205 |
| 2004/0002982 | A1 * | 1/2004 | Ersek et al. | 707/100 |
| 2004/0117369 | A1 * | 6/2004 | Mandal et al. | 707/8 |
| 2004/0158838 | A1 * | 8/2004 | Tracey et al. | 719/316 |
| 2004/0181529 | A1 * | 9/2004 | Hiltgen et al. | 707/9 |
| 2004/0255052 | A1 * | 12/2004 | Peruta | 710/1 |
| 2005/0033795 | A1 * | 2/2005 | Wood | 709/200 |
| 2005/0050141 | A1 * | 3/2005 | An et al. | 709/203 |
| 2005/0138034 | A1 * | 6/2005 | Faraj | 707/10 |
| 2005/0182843 | A1 * | 8/2005 | Reistad et al. | 709/230 |
| 2006/0069774 | A1 * | 3/2006 | Chen et al. | 709/225 |
| 2006/0271911 | A1 * | 11/2006 | Palapudi et al. | 717/106 |
| 2006/0271991 | A1 * | 11/2006 | Bae et al. | 725/118 |

(Continued)

OTHER PUBLICATIONS

Debusmann et al.—"SLA-driven Management of Distributed Systems Using the Common Information Model"—Integrated Network Management, 2003, IFIP/IEEE Eighth International Symposium Mar. 24-28, 2003 (pp. 563-576).*

(Continued)

*Primary Examiner* — Jean B Fleurantin
*Assistant Examiner* — Anh Ly
(74) *Attorney, Agent, or Firm* — Murphy & King, PC (57) ABSTRACT

An automated technique for generating target metadata for a CIM-enabled managed entity is provided. A method of generating management metadata for a resource comprises receiving information indicating a resource to be managed, obtaining information relating to the resource, extracting properties relating to management of the resource from the information relating to the resource, selecting from the extracted properties at least one property that is relevant to management of the resource, and for each of the at least one selected properties, generating metadata enabling the resource to be managed.

21 Claims, 3 Drawing Sheets

U.S. PATENT DOCUMENTS

| | | | |
|---|---|---|---|
| 2007/0073877 A1* | 3/2007 | Boykin et al. | 709/225 |
| 2007/0130235 A1* | 6/2007 | Rakoff et al. | 707/205 |
| 2007/0266035 A1* | 11/2007 | Hays et al. | 707/10 |
| 2007/0299848 A1* | 12/2007 | Markel et al. | 707/10 |
| 2008/0028058 A1* | 1/2008 | Shaw et al. | 709/223 |
| 2008/0033972 A1* | 2/2008 | Yin et al. | 707/101 |
| 2008/0065664 A1* | 3/2008 | Kehn et al. | 707/101 |
| 2008/0126551 A1* | 5/2008 | Conner et al. | 709/230 |
| 2008/0228781 A1* | 9/2008 | Chen et al. | 707/10 |

OTHER PUBLICATIONS

Berardi et al.—"Using the CIM Conceptualization in Automatic System Management: the System Management Ontology Project"—2003—CiteSeer, IBM SWG Rome Lab, (pp. 1-13).*

Agarwal et al—"A Service Creation Environment Based on End to End Composition of Web Services"—proceedings of the 14th International Conference on World Wide Web, Chiba Japan May 10-14, 2005 (pp. 128-137).*

* cited by examiner

METHOD AND SYSTEM FOR TRANSFORMING METADATA MODELED IN THE COMMON INFORMATION MODEL INTO GRID CONTROL TARGET METADATA

BACKGROUND OF THE INVENTION

1. Field of the Invention

The present invention relates to estimating resource usage, such as disk space usage, by database structures, such as text indexes.

2. Description of the Related Art

A critical part of the architecture of enterprise management software is the management agent. The management agent collects monitoring and management information from managed entities (also called "Targets"). The definition of what to collect, how to collect it and how often to refresh the information is provided by means of "Target Metadata" and "Collection Metadata" files.

More and more managed entities are now being instrumented using an industry standard model and protocol called CIM/WBEM. CIM stands for "Common Information Model" and WBEM stands for "Web Based Enterprise Management". Both are developed under the aegis of the Distributed Management Task Force—an industry standards body (http://www.dmtf.org).

Typically, the target metadata for any CIM-enabled managed entity must be individually handcrafted—a lengthy, error-prone and tedious process. A need arises for an automated technique by which target metadata for a CIM-enabled managed entity can be generated.

SUMMARY OF THE INVENTION

The present invention provides an automated technique for generating target metadata for a CIM-enabled managed entity. The present invention includes contacting a running CIM Object Manager (henceforth referred to as CIMOM) that exposes information about the CIM-enabled entity. The CIMOM contains the CIM metadata describing the entity. This metadata is queried and the corresponding target metadata and collection metadata files are generated. Code that will enable a default report to be generated for the managed entity may also be automatically generated.

While one embodiment of the present invention requires a CIMOM to be running in order for target metadata files to be generated, an embodiment that does not require a CIMOM to be running is also contemplated. In this embodiment, the target metadata files are generated by parsing text files where the CIM metadata is defined—these files are called MOF files (MOF=Managed Object Format).

In one embodiment of the present invention, a method of generating management metadata for a resource comprises receiving information indicating a resource to be managed, obtaining information relating to the resource, extracting properties relating to management of the resource from the information relating to the resource, selecting from the extracted properties at least one property that is relevant to management of the resource, and for each of the at least one selected properties, generating metadata enabling the resource to be managed.

In one aspect of the present invention, the information indicating a resource to be managed may be received from a user. The information indicating a resource to be managed may comprise information specifying CIM classes that define the resource to be managed.

In one aspect of the present invention, information relating to the resource may be obtained by using a Web service. The information indicating a resource to be managed may comprise information specifying CIM classes that define the resource to be managed and the Web service obtains the definition of the specified CIM classes.

In one aspect of the present invention, the method may further comprise converting a format of the at least one selected property. The generated metadata may comprise the converted property. The generated metadata may further comprise at least one of a format of the converted property, a frequency of update of a metric, and a threshold for generating an alert.

In one aspect of the present invention, the metadata may be generated using a CIM Object Manager or the metadata may be generated by parsing text files where the CIM metadata is defined.

BRIEF DESCRIPTION OF THE DRAWINGS

Further features and advantages of the invention can be ascertained from the following detailed description that is provided in connection with the drawings described below.

DETAILED DESCRIPTION OF THE PREFERRED EMBODIMENTS

In computing, the Common Information Model (CIM) is a standard defined by organizations such as the Distributed Management Task Force (DMTF) and the IEC. The CIM standard includes the CIM Schema, a conceptual schema that defines how the managed elements in an IT environment are represented as a common set of objects and relationships between them. CIM allows multiple parties to exchange management information about these managed elements. CIM represents these managed elements and the management information, but also provides means to actively control and manage these elements. The managed elements represented in the CIM Schema include most of today's elements in an IT environment, for example Computer systems, Operating systems, Networks, Middleware, Services and Storage.

The CIM Schema defines a common basis for representing these managed elements. Since most managed elements have product and vendor specific behavior, the CIM Schema is extensible in order to allow the producers of these elements to represent their specific features seamlessly together with the CIM defined common base functionality.

Besides the CIM Schema itself, the CIM standard also defines the concepts and rules by which the CIM Schema is defined, including a language called Managed Object Format (MOF) in which the CIM Schema and any product specific extensions are defined. The concepts are based upon UML, so the CIM Schema is object-oriented: The managed elements are represented as CIM classes and any relationships between them are represented as CIM associations. Inheritance representation of common base elements and more specific derived elements. The MOF language and the concepts used to define the CIM Schema are described in the CIM Infrastructure Specification.

Figure 1:
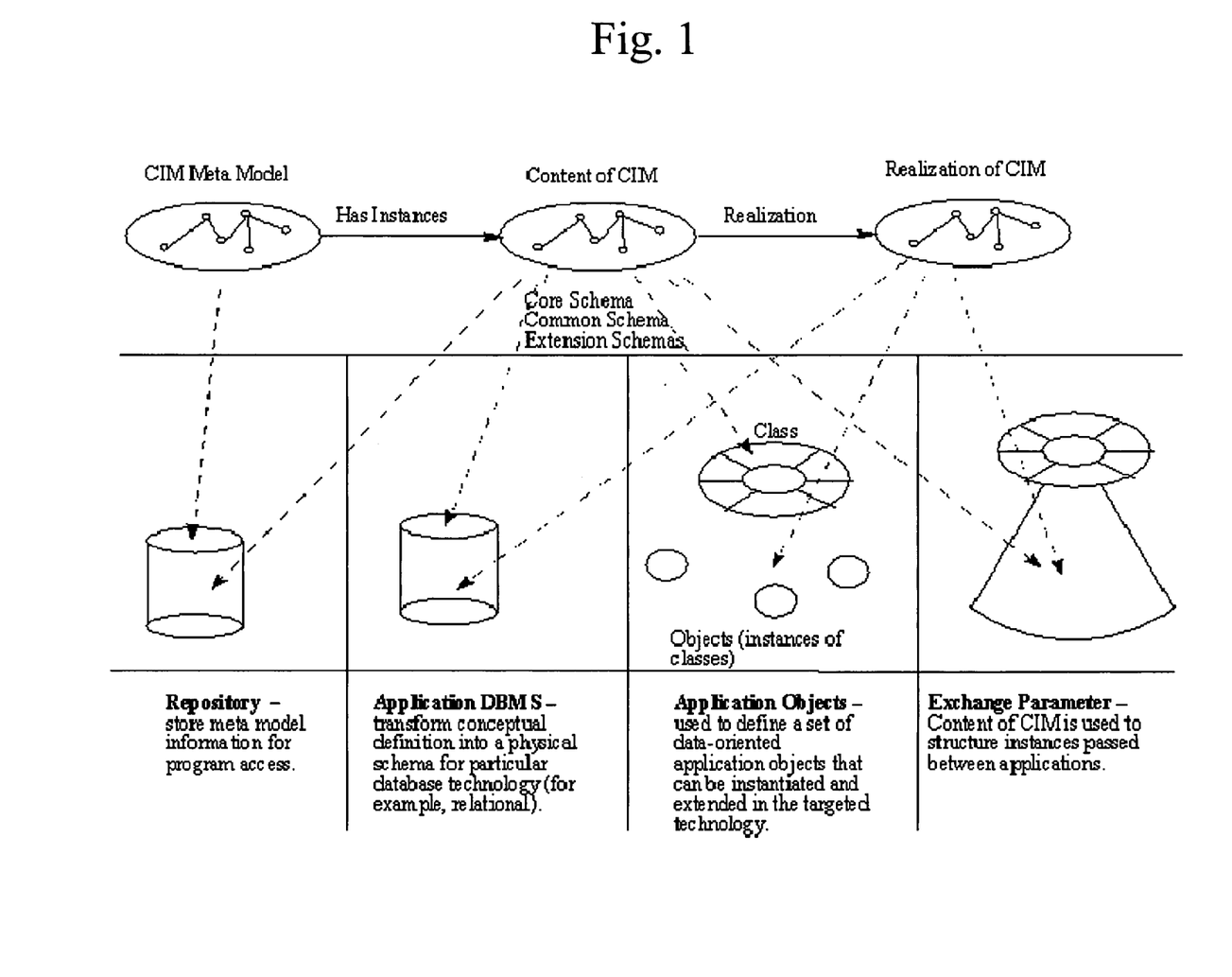
FIG. 1 is an exemplary block diagram of a database management system in which the present invention may be implemented.

CIM is a conceptual model that is not bound to a particular implementation. This allows it to be used to exchange management information in a variety of ways. Examples of several implementations of CIM are shown in FIG. 1. It is possible to use these implementations, and others, in combination within a management application. The present invention is not limited to a particular implementation of CIM. Rather, the present invention contemplates use with any implementation, or combination of implementations, of CIM.

As a repository, the constructs defined in the model are stored in a database. These constructs are not instances of the object, relationship, and so on; but rather are definitions to be used in establishing objects and relationships. The meta model used by CIM is stored in a repository that becomes a representation of the meta model. This is accomplished by mapping the meta-model constructs into the physical schema of the targeted repository, then populating the repository with the classes and properties expressed in the Core model, Common model and Extension schemas.

For an application DBMS, the CIM is mapped into the physical schema of a targeted DBMS (for example, relational). The information stored in the database consists of actual instances of the constructs. Applications can exchange information when they have access to a common DBMS and the mapping occurs in a predictable way.

For application objects, the CIM is used to create a set of application objects in a particular language. Applications can exchange information when they can bind to the application objects.

For exchange parameters, the CIM—expressed in some agreed-to syntax—is a neutral form used to exchange management information by way of a standard set of object APIs. The exchange can be accomplished via a direct set of API calls, or it can be accomplished by exchange-oriented APIs which can create the appropriate object in the local implementation technology.

Enterprise environments consist of a wide variety of components: OS platforms, hardware, software, network, and storage devices. All of these components work in concert to deliver critical information and functionality required to keep enterprise operations performing optimally and providing information to make important business decisions. In order to monitor components or custom applications specific to an environment, metadata specifying the metrics that should be monitored for each target type, and the methods to be used retrieve those metrics must be defined.

For example, below is an excerpt from an exemplary metadata file showing a sample metric declaration for collecting CPU Utilization is as follows:

```
<Metric NAME="Load" TYPE="TABLE">
  <TableDescriptor>
    <ColumnDescriptor NAME="CPU Utilization"
    TYPE="NUMBER"/>
  </TableDescriptor>
  <QueryDescriptor FETCHLET_ID="OS">
<Property    NAME="scriptsDir"    SCOPE="SYSTEMGLOBAL">
scriptsDir
</Property>
<Property NAME="script" SCOPE="GLOBAL">
%scriptsDir% /cpu_util.pl </Property>
  </QueryDescriptor>
</Metric>
```

The Distributed Management Task Force has defined a standard known as the Web Based Enterprise Management protocol (WBEM), which defines protocols for the interaction between systems management infrastructure components implementing CIM, a concept of DMTF management profiles that allows defining the behavior of the elements defined in the CIM Schema, the CIM Query Language (CQL) and other specifications needed for the interoperability of CIM infrastructure. In order to retrieve data in WBEM, objects known as fetchlets may be used. A fetchlet is a parameterized data access mechanism that takes arguments as input and returns formatted data. Each fetchlet handles a specific type of data access. Fetchlets require instructions in order to define the specific type of data access (and method for performing that access) handled by the fetchlet. These instructions may be implemented in the form of metadata (MD), and stored in metadata files (MDF) for used by fetchlets. The data access method defined by the MDF may include protocols used access to various resources, user interactions, such as requesting setup information from the user, and other procedures. Examples of protocols that may be used to access resources include the Common Information Model (CIM), etc. Services that may be used to access resources include CIM services, WEBM services, etc. It is to be noted that the use of fetchlets is only an example of a mechanism to which the present invention may be applied, that the CIM protocol is only an example of a protocol that may be used by the present invention, and that CIM services, WEBM services are only examples of services that may be used by the present invention. The present invention contemplates application to any mechanism that uses metadata files to define access to resources, as well any protocols and services that provide access to resources.

An exemplary process 200 of transforming metadata modeled in the CIM into grid control target metadata such as that shown above is shown in FIG. 2. Process 200 begins with step 202, in which user interaction is performed in which the user specifies the resources that are to be managed. Typically, the user specifies the CIM classes that define the resources that are to be managed. The user may be any person or system that has permissions to specify resources that are to be managed. The user interaction may take any form—text or data files, graphical user interface, etc., as long as the user is able to specify the resources that are to be managed. The resources may be, for example, Computer systems, Operating systems, Networks, Middleware, Services and Storage, etc. The present invention contemplates any type of user, any type of user interaction, and any type of resource that is to be managed.

Figure 2:
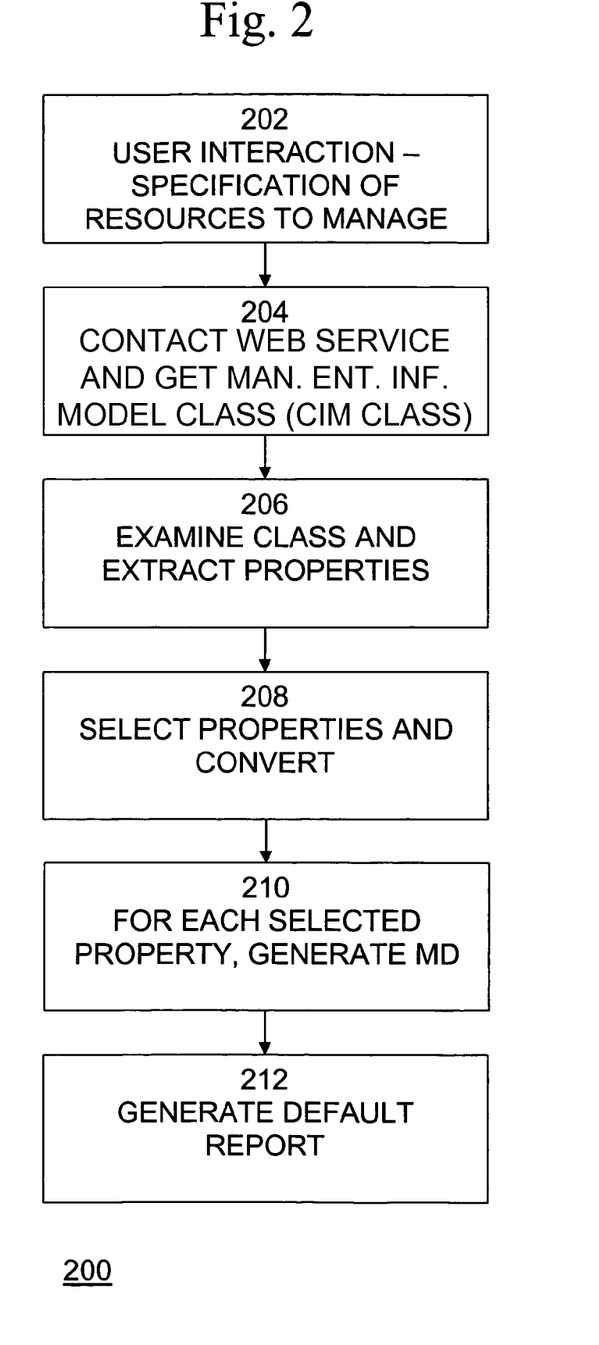
FIG. 2 is an exemplary flow diagram of a process of transforming metadata modeled in the CIM into grid control target metadata.

In step 204, a web service is contacted and the definition of the CIM classes specified by the user are obtained. A Web service is a software system designed to support interoperable machine-to-machine interaction over a network. The Web service interacts with the appropriate systems, such as a running CIM Object Manager (CIMOM), that exposes information and obtains the definition of the CIM classes specified by the user. In step 206, the obtained CIM classes are examined and the properties relating to the resource to be managed are extracted. For example, if the resource is a disk drive, properties such as the number of cylinders, the number of sectors, the number of heads, etc. may be obtained.

In step 208, the extracted properties that are relevant to the resources that are to be managed are selected. The selected properties are then converted to a format appropriate for the target metadata file, such as a numeric value or a string. If the property cannot be converted, it may be discarded. In step 210, for each selected property, metadata (MD) is generated.

In addition to the property information itself, additional information, such as the format of the property information, the frequency of update of the metric of the resource that is being monitored, thresholds for generating alerts, etc., may be included in the generated metadata. While one embodiment of the present invention requires a CIMOM to be running in order for target metadata files to be generated, an embodiment that does not require a CIMOM to be running is also contemplated. In this embodiment, the target metadata files are generated by parsing text files where the CIM metadata is defined—these files are called Managed Object Format (MOF) files.

In step 212, a default report may be generated that includes a snapshot of the characteristics and behavior of the resource. For example, a PL/SOL file containing instructions that utilize the reporting infrastructure framework's constructs and tools, may be loaded into the repository. This PL/SQL file is the driver "script" that when run, causes the report to be generated. Typically, the user can customize the report thereafter.

Figure 3:
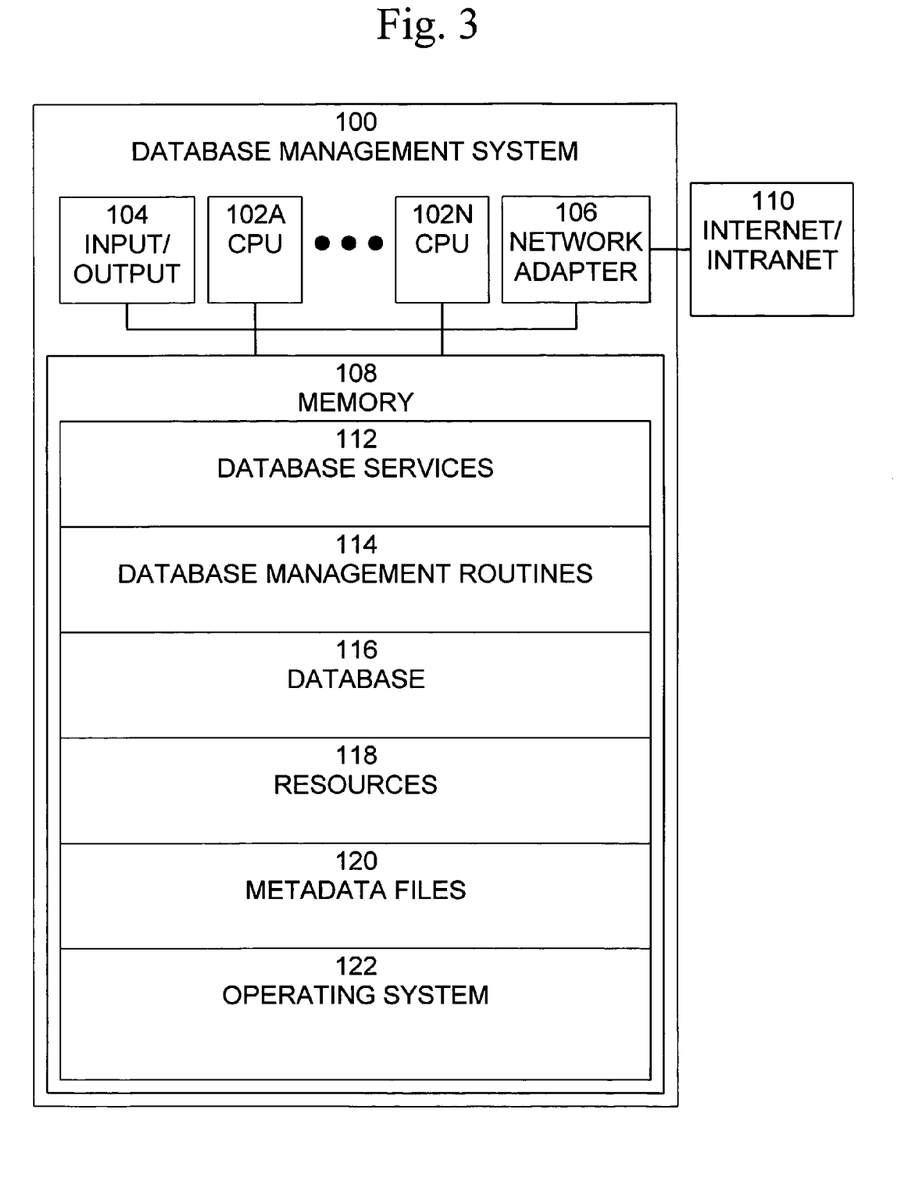
FIG. 3 is an exemplary block diagram of a database management system (DBMS) in which the present invention may be implemented.

An exemplary block diagram of a database management system (DBMS) 300 in which the present invention may be implemented, is shown in FIG. 3. DBMS 300 is typically a programmed general-purpose computer system, such as a personal computer, workstation, server system, and minicomputer or mainframe computer. DBMS 300 includes one or more processors (CPUs) 302A-302N, input/output circuitry 304, network adapter 306, and memory 308. CPUs 302A-302N execute computer program instructions in order to carry out the functions of the present invention. Typically, CPUs 302A-302N are one or more microprocessors, such as an INTEL PENTIUM® processor. FIG. 3 illustrates an embodiment in which DBMS 300 is implemented as a single multi-processor computer system, in which multiple processors 302A-302N share system resources, such as memory 308, input/output circuitry 304, and network adapter 306. However, the present invention also contemplates embodiments in which DBMS 300 is implemented as a plurality of networked computer systems, which may be single-processor computer systems, multi-processor computer systems, or a mix thereof. The present invention also contemplates embodiment in a computer program product comprising a computer-readable storage medium and computer program instructions, recorded on the computer-readable storage medium, executable by a processor, for performing the steps of the invention.

Input/output circuitry 304 provides the capability to input data to, or output data from, database/DBMS 300. For example, input/output circuitry may include input devices, such as keyboards, mice, touchpads, trackballs, scanners, etc., output devices, such as video adapters, monitors, printers, etc., and input/output devices, such as, modems, etc. Network adapter 306 interfaces database/DBMS 300 with Internet/intranet 310. Internet/intranet 310 may include one or more standard local area network (LAN) or wide area network (WAN), such as Ethernet, Token Ring, the Internet, or a private or proprietary LAN/WAN.

Memory 308 stores computer program instructions that are executed by, and data that are used and processed by, CPU 302 to perform the functions of DBMS 300. Memory 308 may include electronic memory devices, such as random-access memory (RAM), and computer-readable storage media, such as read-only memory (ROM), programmable read-only memory (PROM), electrically erasable programmable read-only memory (EEPROM), flash memory, magnetic disk drives, tape drives, optical disk drives, etc., which may use an integrated drive electronics ODE) interface, or a variation or enhancement thereof, such as enhanced IDE (EIDE) or ultra direct memory access (UDMA), or a small computer system interface (SCSI) based interface, or a variation or enhancement thereof, such as fast-SCSI, wide-SCSI, fast and wide-SCSI, etc, or a fiber channel-arbitrated loop (FC-AL) interface.

The contents of memory 308 varies depending upon the functions that DBMS 300 is programmed to perform. One of skill in the art would recognize that these functions, along with the memory contents related to those functions, may be included on one system, or may be distributed among a plurality of systems, based on well-known engineering considerations. The present invention contemplates any and all such arrangements.

In the example shown in FIG. 3, memory 308 includes database management routines 310, database 312, database 314, database services 315, and operating system 316. Database management routines 310 provide the capability to store, access, and manage information in one or more databases, such as those included in database 312. Database 312 provides storage and organization for information from one or more data tables included in database 312. For example, database 312 may include data tables 318, which store data, and indexes 320, which provide the capability to quickly access particular data. Database services 314 include particular features that may be provided by the system. For example, database services 314 may include text services 322, secure services 324, search services 326, and other services 328. Operating system 316 provides overall system functionality.

From a technical standpoint, databases can differ widely. The terms relational, network, flat, and hierarchical all refer to the way a database organizes information internally. The internal organization can affect how quickly and flexibly you can extract information.

Each database includes a collection of information organized in such a way that computer software can select and retrieve desired pieces of data. Traditional databases are organized by fields, records, and files. A field is a single piece of information; a record is one complete set of fields; and a file is a collection of records. An alternative concept in database design is known as Hypertext. In a Hypertext database, any object, whether it be a piece of text, a picture, or a film, can be linked to any other object. Hypertext databases are particularly useful for organizing large amounts of disparate information, but they are not designed for numerical analysis.

Typically, a database includes not only data, but also low-level database management functions, which perform accesses to the database and store or retrieve data from the database. Such functions are often termed queries and are performed by using a database query language, such as Structured Query Language (SQL). SQL is a standardized query language for requesting information from a database. Historically, SQL has been a popular query language for database management systems running on minicomputers and mainframes. Increasingly, however, SQL is being supported by personal computer database systems because it supports distributed databases (databases that are spread out over several computer systems). This enables several users on a local-area network to access the same database simultaneously.

Most full-scale database systems are relational database systems. Small database systems, however, use other designs that provide less flexibility in posing queries. Relational databases are powerful because they require few assumptions about how data is related or how it will be extracted from the database. As a result, the same database can be viewed in many different ways. An important feature of relational systems is that a single database can be spread across several tables. This differs from flat-file databases, in which each database is self-contained in a single table.

Typically, a database application includes data entry functions and data reporting functions. Data entry functions provide the capability to enter data into a database. Data entry may be performed manually, by data entry personnel, automatically, by data entry processing software that receives data from connected sources of data, or by a combination of manual and automated data entry techniques. Data reporting functions provide the capability to select and retrieve data from a database and to process and format that data for other uses. Typically, retrieved data is used to display information to a user, but retrieved data may also be used for other functions, such as account settlement, automated ordering, numerical machine control, etc.

Database applications typically make use of database services 314, which provide particular features to the system. For example, text services 322 may provide the capability to use standard SQL to index, search, and analyze text and documents stored in the database, in files, and on the web. The text services may perform linguistic analysis on documents, as well as search text using a variety of strategies including keyword searching, context queries, Boolean operations, pattern matching, mixed thematic queries, HTML/XML section searching, and so on. The text services may render search results in various formats including unformatted text, HTML with term highlighting, and original document format. The text services may support multiple languages and use relevance-ranking technology to improve search quality. The text services may also offer features like classification, clustering, and support for information visualization metaphors.

As another example, secure services 324 may provide the security capabilities in the areas of privacy, regulatory compliance, and data consolidation. Such features may include column based access controls with Virtual Private Database, enhancements to Fine Grained Auditing, support for the AES algorithm for database encryption, expanded support for PKI and integration of Label Security with Identity Management.

As another example, search service 326 may provide the capability to perform a secure, high quality, easy-to-use search across all enterprise information assets. The secure services may provide the capability to search and locate public, private and shared content across Intranet web-servers, databases, files on local disk or on file-servers, IMAP email, document management systems, applications, and portals. The secure services may provide highly secure crawling, indexing, and searching spanning diverse public or private data sources and analytics on search results and understanding of usage patterns.

Other database services 328 may also or alternatively be provided. The present invention is not limited to the particular exemplary services described above, but rather contemplates use with any database service that uses resources.

As shown in FIG. 3, the present invention contemplates implementation on a system or systems that provide multi-processor, multi-tasking, multi-process, and/or multi-thread computing, as well as implementation on systems that provide only single processor, single thread computing. Multi-processor computing involves performing computing using more than one processor. Multi-tasking computing involves performing computing using more than one operating system task. A task is an operating system concept that refers to the combination of a program being executed and bookkeeping information used by the operating system. Whenever a program is executed, the operating system creates a new task for it. The task is like an envelope for the program in that it identifies the program with a task number and attaches other bookkeeping information to it. Many operating systems, including UNIX®, OS/2®, and Windows®, are capable of running many tasks at the same time and are called multitasking operating systems. Multi-tasking is the ability of an operating system to execute more than one executable at the same time. Each executable is running in its own address space, meaning that the executables have no way to share any of their memory. This has advantages, because it is impossible for any program to damage the execution of any of the other programs running on the system. However, the programs have no way to exchange any information except through the operating system (or by reading files stored on the file system). Multi-process computing is similar to multi-tasking computing, as the terms task and process are often used interchangeably, although some operating systems make a distinction between the two.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A computer-implemented method of generating management metadata for a resource comprising:
   receiving at a computer system information indicating a resource to be managed;
   obtaining information relating to the resource;
   extracting properties relating to management of the resource from the information relating to the resource;
   selecting from the extracted properties at least one property that is relevant to management of the resource;
   converting a format of the at least one selected property; and
   for each of the at least one selected properties, automatically generating, using the computer system, metadata enabling the resource to be managed based on each of the at least one selected properties, wherein the generated metadata comprises the converted property, a format of the converted property, a frequency of update of a metric, and a threshold for generating an alert;
   wherein information relating to the resource is obtained by using a Web service and wherein the information indicating a resource to be managed comprises information specifying managed entity information model classes that define the resource to be managed and the Web service obtains the definition of the specified managed entity information model classes.

2. The method of claim 1, wherein the managed entity information model classes are Common Information Model (CIM) classes.

3. The method of claim 2, wherein the information indicating a resource to be managed is received from a user.

4. The method of claim 2, wherein the metadata is generated using a CIM Object Manager.

5. The method of claim 2, wherein the metadata is generated by parsing text files where the CIM metadata is defined.

6. A computer system for generating management metadata for a resource comprising: a processor operable to execute computer program instructions;
   a memory operable to store computer program instructions executable by the processor; and
   computer program instructions stored in the memory and executable to perform at the system the steps of:
   receiving information indicating a resource to be managed;
   obtaining information relating to the resource;

extracting properties relating to management of the resource from the information relating to the resource;

selecting from the extracted properties at least one property that is relevant to management of the resource;

converting a format of the at least one selected property; and for each of the at least one selected properties, automatically generating, using the computer system, metadata enabling the resource to be managed based on each of the at least one selected properties, wherein the generated metadata comprises the converted property, a format of the converted property, a frequency of update of a metric, and a threshold for generating an alert;

wherein information relating to the resource is obtained by using a Web service and wherein the information indicating a resource to be managed comprises information specifying managed entity information model classes that define the resource to be managed and the Web service obtains the definition of the specified managed entity information model classes.

7. The computer system of claim 6, wherein the managed entity information model classes are Common Information Model (CIM) classes.

8. The computer system of claim 7, wherein the information indicating a resource to be managed is received from a user.

9. The computer system of claim 7, wherein the metadata is generated using a CIM Object Manager.

10. The computer system of claim 7, wherein the metadata is generated by parsing text files where the CIM metadata is defined.

11. A computer program product for generating management metadata for a resource comprising:

a non-transitory computer readable storage medium;

computer program instructions, recorded on the computer readable storage medium, executable by a processor, for performing the steps of receiving information indicating a resource to be managed;

obtaining information relating to the resource;

extracting properties relating to management of the resource from the information relating to the resource;

selecting from the extracted properties at least one property that is relevant to management of the resource;

converting a format of the at least one selected property; and for each of the at least one selected properties, automatically generating, using the computer system, metadata enabling the resource to be managed based on each of the at least one selected properties, wherein the generated metadata comprises the converted property, a format of the converted property, a frequency of update of a metric, and a threshold for generating an alert;

wherein information relating to the resource is obtained by using a Web service and wherein the information indicating a resource to be managed comprises information specifying managed entity information model classes that define the resource to be managed and the Web service obtains the definition of the specified managed entity information model classes.

12. The computer program product of claim 11, wherein the managed entity information model classes are Common Information Model (CIM) classes.

13. The computer program product of claim 12, wherein the information indicating a resource to be managed is received from a user.

14. The computer program product of claim 12, wherein the metadata is generated using a CIM Object Manager.

15. The computer program product of claim 12, wherein the metadata is generated by parsing text files where the CIM metadata is defined.

16. A computer-implemented method of generating management metadata for a resource comprising:

receiving at a computer system information indicating a resource to be managed;

obtaining information relating to the resource;

extracting properties relating to management of the resource from the information relating to the resource;

selecting from the extracted properties at least one property that is relevant to management of the resource; and for each of the at least one selected properties, automatically generating, using the computer system, metadata enabling the resource to be managed based on each of the at least one selected properties;

wherein information relating to the resource is obtained by using a Web service and wherein the information indicating a resource to be managed comprises information specifying managed entity information model classes that define the resource to be managed and the Web service obtains the definition of the specified managed entity information model classes.

17. The method of claim 16, wherein the managed entity information model classes are Common Information Model (CIM) classes.

18. A computer system for generating management metadata for a resource comprising: a processor operable to execute computer program instructions;

a memory operable to store computer program instructions executable by the processor; and computer program instructions stored in the memory and executable to perform at the system the steps of:

receiving information indicating a resource to be managed;

obtaining information relating to the resource;

extracting properties relating to management of the resource from the information relating to the resource;

selecting from the extracted properties at least one property that is relevant to management of the resource; and for each of the at least one selected properties, automatically generating, using the computer system, metadata enabling the resource to be managed based on each of the at least one selected properties;

wherein information relating to the resource is obtained by using a Web service and wherein the information indicating a resource to be managed comprises information specifying managed entity information model classes that define the resource to be managed and the Web service obtains the definition of the specified managed entity information model classes.

19. The computer system of claim 18, wherein the managed entity information model classes are Common Information Model (CIM) classes.

20. A computer program product for generating management metadata for a resource comprising:

a non-transitory computer readable storage medium;

computer program instructions, recorded on the computer readable storage medium, executable by a processor, for performing the steps of receiving information indicating a resource to be managed;

obtaining information relating to the resource;

extracting properties relating to management of the resource from the information relating to the resource;

selecting from the extracted properties at least one property that is relevant to management of the resource; and for each of the at least one selected properties, automatically generating, using the computer system, metadata enabling the resource to be managed based on each of the at least one selected properties;
wherein information relating to the resource is obtained by using a Web service and wherein the information indicating a resource to be managed comprises information specifying managed entity information model classes that define the resource to be managed and the Web service obtains the definition of the specified managed entity information model classes.

21. The computer program product of claim 20, wherein the managed entity information model classes are Common Information Model (CIM) classes.

* * * * *

UNITED STATES PATENT AND TRADEMARK OFFICE
CERTIFICATE OF CORRECTION

| | | |
|---|---|---|
| PATENT NO. | : 8,019,791 B2 | Page 1 of 1 |
| APPLICATION NO. | : 11/603117 | |
| DATED | : September 13, 2011 | |
| INVENTOR(S) | : Bhat | |

It is certified that error appears in the above-identified patent and that said Letters Patent is hereby corrected as shown below:

In column 5, line 15, delete "PL/SOL" and insert -- PL/SQL --, therefor.

In column 5, line 67, delete "ODE)" and insert -- (IDE) --, therefor.

Signed and Sealed this
Twenty-ninth Day of November, 2011

David J. Kappos
*Director of the United States Patent and Trademark Office*